United States Patent [19]

Lindberg et al.

[11] 3,820,994

[45] June 28, 1974

[54] PENETRATION OF POLYIMIDE FILMS

[75] Inventors: Frank A. Lindberg, Baltimore; Seymour J. Ponemone, Randallstown; Stephen G. Konsowski, Glen Burnie; Maurice B. Shamash, Randallstown, all of Md.

[73] Assignee: Westinghouse Electric Corporation, Pittsburgh, Pa.

[22] Filed: June 7, 1972

[21] Appl. No.: 260,636

[52] U.S. Cl. ........................ 96/36, 96/36.2, 29/578, 156/8, 156/17

[51] Int. Cl. ........................ G03c 5/00

[58] Field of Search ................ 96/36, 36.2; 29/578; 156/8, 17; 117/215

[56] References Cited

UNITED STATES PATENTS

| | | | |
|---|---|---|---|
| 3,255,006 | 6/1966 | Bailey | 96/36.2 |
| 3,376,139 | 4/1968 | Giangualano et al. | 96/36.2 |
| 3,415,648 | 12/1968 | Certa | 96/36 |
| 3,576,630 | 4/1971 | Yanagawa | 96/36.2 |
| 3,617,411 | 11/1971 | Couture | 96/36 |
| 3,671,243 | 6/1972 | Campbell et al. | 96/36.2 |

*Primary Examiner*—Ronald H. Smith
*Assistant Examiner*—Edward C. Kimlin
*Attorney, Agent, or Firm*—D. Schron

[57] ABSTRACT

There is disclosed a method of producing holes in polyimide films, typically KAPTON polyimide films, of substantial thickness, typically about .005 inches. Such films are typically used for multilayer solid-state circuits. An aluminum coating is deposited by vapor deposition on both surfaces of the film, typically to a thickness of about .0004 inches. A photoresist is deposited on the coating on each surface of the film and is imaged to define the holes in such manner that the areas of each hole in both sides of the film are coextensive. The film is developed exposing the aluminum over the areas of the holes. The aluminum at the hole areas is then etched or dissolved by an acid solvent. Thereafter the polyimide where the aluminum has been etched away and the unexposed photoresist are etched with hydrazine. Finally, the aluminum which is now exposed is removed by an acid solvent.

22 Claims, 6 Drawing Figures

PENETRATION OF POLYIMIDE FILMS

REFERENCE TO RELATED DOCUMENTS

The following documents relating to polyimides, their properties and uses are incorporated herein by reference:

U.S. Pat. Nos.
- 3,179,614 — Edwards
- 3,179,630 — Endrey
- 3,179,631 — Endrey
- 3,179,632 — Hendrix
- 3,179,633 — Endrey
- 3,179,634 — Edwards
- 3,179,635 — Frost et al
- 3,260,691 — Lavin
- 3,554,743 — Maas
- 3,554,744 — Maas duPont Technical Information Bulletins on duPont KAPTON Polyimide Films Bulletins having the following titles:
1. Etching Holes
2. Safety Considerations
3. Safe Handling Practices
4. Application and Property Data for Kapton
5. Specification for KAPTON Polyimide Film for use as a capacitor dielectric.

Bulletins having the following identifications:

| | | |
|---|---|---|
| H-1B | F-1B | H-66-1C |
| H-66-2A | F-66-1B | F-66-2B |
| H-2 | H-4 | H-10-98 |
| H-12 | H-77 | H-97 |
| H-97-1B | H-97-2 | H-97C |
| H-110C | H-110-21 | H-110-22B |
| H-110-23A | H-110-61 | H-110-62 |
| H-110-63 | H-110-64 | H-110-65 |

As to photoresists, KODAK Industrial Data Book entitled "KODAK Photosensitive Resists for Industry," Copyright 1962 Eastman Kodak Co. is incorporated herein by reference.

On deposition of metal — Hugh R. Smith, Jr. Airco Temescal, Berkeley, California — *Deposition Distribution and Rates From Electron-Beam — Heated Vapor Sources* — Paper presented to the Society of Vacuum Coaters, Mar. 5, 1968.

BACKGROUND OF THE INVENTION

This invention relates to the penetration by chemical means of polyimides and has particular relationship to the forming of holes or windows in polyimide films for etching or dissolving the film at defined areas where the holes are to be produced. Typically, this invention relates to the forming of clearance holes in polyimide films which are used as supports for multilayer solid-state circuits. Typical of polyimide of which the films are produced is KAPTON polyimide film which is sold by E. I. duPont de Nemours Co. of Wilmington, Delaware.

In accordance with the teachings of the prior art holes are produced in polyimide films by coating the films with a photoresist material, imaging a pattern on the coating to define the areas of the projected holes, and etching the photoresist and the film in the areas as defined with hydrazine $NH_2NH_2$. In attempting to etch holes particularly in thick films typically having a thickness of about .005 inches, it has been found that the time for etching the holes is so long that the portion of the photoresist outside of the defined areas breaks down. For example, where the photoresist is negative, the film is exposed to the imaging radiative (typically ultraviolet) light except at the areas to be etched. When the film is developed and the hydrazine is applied to produce the holes, not only does the unexposed photoresist dissolve but the exposed photoresist also breaks down. An attempt was made to reduce the etching time by raising the temperature of the etchant. It was found that the photoresist outside of the defined areas of the exposed photoresist in the above example broke down at the elevated temperatures.

It is an object of this invention to overcome the above-described difficulties encountered in an attempt to produce holes in polyimide film and to provide a method for effectively producing holes in such film in which the photoresist outside of the hole defining areas shall not break down and the walls of the holes produced in the polyimide shall be substantially or very nearly perpendicular to the perforated surfaces.

SUMMARY OF THE INVENTION

In accordance with this invention an adherent coating of a metal, which is resistant to hydrazine, is deposited on the surfaces of the polyimide film typically, by vapor deposition. A photoresist material is deposited on the metal coating and is imaged and developed to define the areas of the desired penetration. The now exposed metal is etched with an acid solvent. The photoresist outside of the defined areas protects the metal under it. The polyimide in the now exposed areas and the photoresist outside of these areas are etched with hydrazine. The metal outside of the exposed areas masks the film under it. After the penetrations are etched this metal is dissolved by an acid solvent. Typically a solution of 65 percent by volume of hydrazine in water is used for polyimide etching. The etching can take place at 60°C but 90°C to 95°C is preferred.

It has been found that the walls of the holes which are produced by this process are remarkably vertical, (assuming that the film is horizontal) rather than pitched at a sharp angle to the horizontal as is the case for etched metal; for example, copper printed-circuit conductors. This advantage appears to result from the fact that the chemical action of the hydrazine on the polyimide is a denaturing action rather than by formation of a metallic salt as is the case in metal etching. The perpendicularity of the walls of the holes to the surface of the film depends on the ratio of the rate of depth penetration of the etching to the rate of lateral penetration this ratio is called the etch factor. A high ratio results in a perpendicularity approaching 90°. The perpendicularity is improved by etching at a temperature substantially higher than room temperature; when etching at room temperature with a water solution of 65 percent hydrazine, the walls of the holes were found to be of irregular shape.

The coating metal is copper or aluminum, the aluminum being preferred because of its superior adherent properties. In metal coating the polyimide it was found that blistering of the metal coating at times occurred. The hydrazine penetrates the blisters and etches the polyimide under the blisters. An aspect of this invention arises from the realization that the blisters were caused by the outgassing of the polyimide when heated after having been coated. The heating is substantial during the coating because the vapor particles have high kinetic energy which is converted into heat when the particles impinge on the film. In accordance with this invention, the polyimide is outgassed before it is metal coated, by being heated at a low pressure, $1 \times 10^{-6}$ Torr to $5 \times 10^{-7}$. This causes the low-vapor pressure solvents in the film to come to the surface and evaporate. Thereafter, the sheet or film is thoroughly cleaned to remove residue and vapor coated with the metal.

It was discovered that adhesion of the metal, particularly aluminum, to the polyimide is improved by deposition of the metal vapor at a high rate while metal deposited at a low rate is more readily etched than metal deposited at a high rate. A firmly adhering coating which is readily etched, is achieved, in accordance with this invention, by depositing the first layers of the coating, for example up to a thickness of a few thousand angstroms, at a high rate, typically about 9,000 to 12,000 angstroms per minute and thereafter gradually reducing the rate of deposition to a low rate.

BRIEF DESCRIPTION OF THE DRAWINGS

For a better understanding of this invention, both as to its organization and as to its method of operation, together with additional objects and advantages thereof, reference is made to the following description taken in connection with the accompanying drawings, in which:

FIG. 2 is presented, not with any intention of limiting this invention, but for the purpose of aiding those skilled in the art in practicing this invention.

DETAILED DESCRIPTION OF THE INVENTION

Figure 1:
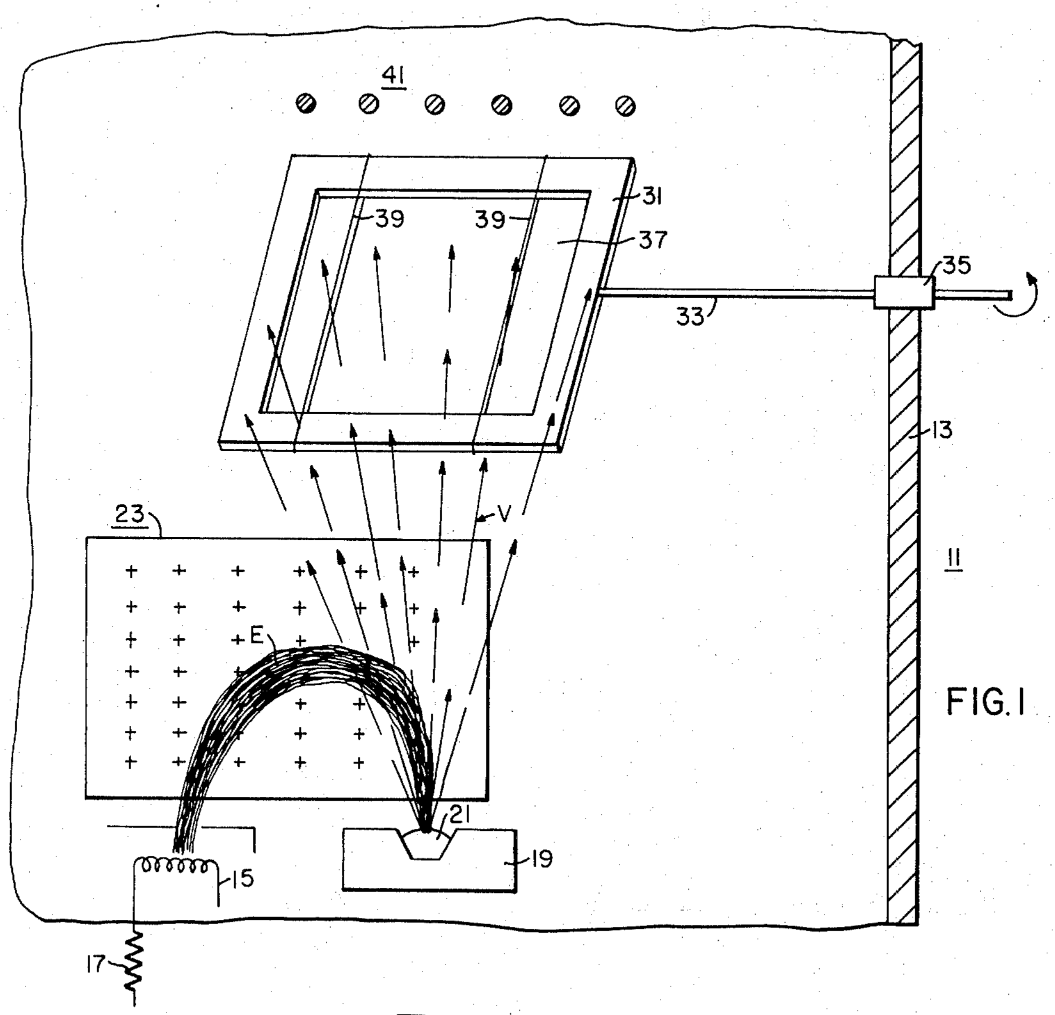
FIG. 1 is a diagrammatic view showing apparatus for degassing and coating a polyimide film.
Figure 3:
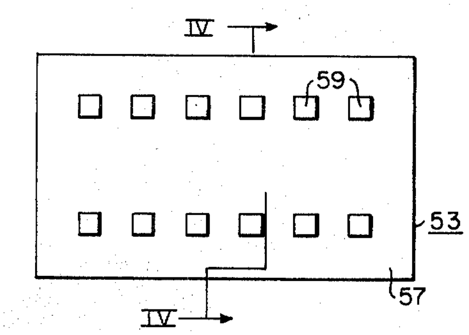
FIG. 3 is a plan view of a fixture for imaging the photoresist coating on the metal coating on both faces of the polyimide film so that the patterns on both faces are precisely coextensive or congruent.

The apparatus shown in FIG. 1 is a vacuum chamber 11 (only a fragmental part of the wall 13 shown) which is provided with conventional pumps, valves and seals (not shown) for evacutating to a pressure of about $10^{-7}$ Torr (or lower) and for maintaining this pressure. Within the chamber there is a filament 15 (or other type of cathode) for generating an electron beam E. The filament 15 is heated from a source (not shown) through a variable resistor 17 which may be set to set the filament current.

A water-cooled hearth 19 contains the coating metal 21. Typically a potential of the order of 10,000 volts is impressed between the metal 21 through the hearth 19, usually at ground, and the filament which is maintained electrically negative relative to the hearth 19. The beam E is deflected by a magnetic field perpendicular to the beam E which is impressed by an electromagnet 23. Typically the electron current may be set at about 0.8 amperes for deposit at a high rate and at about .5 to .6 amperes for deposition at a lower rate.

Figure 2:
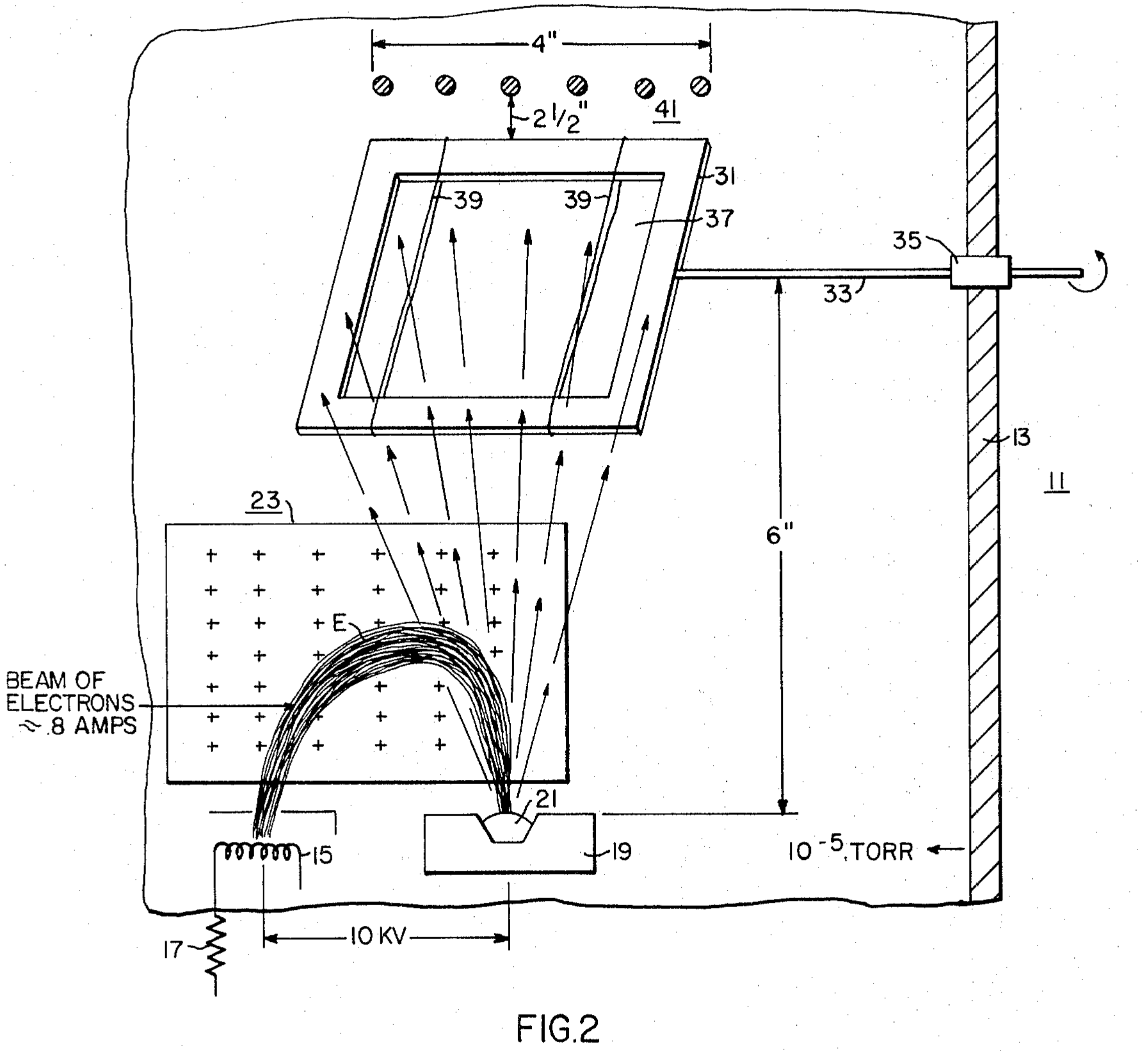
FIG. 2 is a view similar to FIG. 1 but showing the important dimensions of apparatus which has been used successfully in coating film.

The apparatus shown in FIGS. 1 and 2 includes a frame 31 which is rotatably suspended on a pin or shaft 33 that passes through a vacuum seal 35 in the wall 13. The shaft 33 and frame 31 can be rotated by hand or by a motor (not shown) from outside of the chamber 11. In the use of the apparatus a sheet 37 of polyimide is mounted on the frame 31 by means of wires 39 or tabs. The frame 31 may be so positioned that the sheet 37 is in the path of the vapor V from the metal 21 produced by the beam E.

The apparatus shown in FIGS. 1 and 2 also includes electric heaters 41 mounted near the frame 31 so as to heat the sheet 37 on the frame.

In the use of this apparatus a film 37 is first mounted on frame 31 and outgassed. For this purpose the chamber 11 is exhausted and the sheet 37 heated by the heater 41 while the coating apparatus 15, 19, 21 remains deenergized. The frame 31 and film 37 may be turned slowly by hand while the film is heated in the evacuated chamber 11. In this way low-vapor pressure solvents in the polyimide drift to the surface of the film and evaporate. Typically for a film 37 ten inches square, the heater 41 is a 500 watt heater and is spaced about 2 ½ inches from the center line of the film 37 which is coextensive with the shaft 33. The chamber 11 is exhausted to a pressure of about $1 \times 10^{-6}$ Torr to $5 \times 10^{-7}$ Torr.

The film 37 is then removed from chamber 11 and thoroughly cleaned. A typical cleaning process is as follows:

*a.* Maintain film 37 for 30 minutes in a boiling solution of Alconox and deionized water.

*b.* Treat the film 37 in the Alconox solution in an ultrasonic cleaner for 15 minutes.

*c.* Rinse the film 37 in hot tap water for 5 minutes.

*d.* Rinse the film 37 in cold deionized water for 5 minutes.

*e.* Place the film 37 in boiling deionized water for 5 minutes.

*f.* Rinse the film 37 in electronic-grade methanol.

*g.* Dry the film 37 by blowing dry nitrogen on it.

*h.* Replace the film in chamber 11 which has been preheated to above 150°F and pump the chamber 11 to a low pressure, (typically $2 \times 10^{-6}$ Torr) with the heater 41 energized.

The coating apparatus 15, 19, 21 is then energized and the film 37 is coated on both faces. The coating is initially at a high deposit rate, typically 9,000 to 12,000 angstroms per minute for apparatus as shown in FIG. 2 until a few thousand (typically 5,000) angstroms are built up then the rate is gradually reduced to a low rate (typically 5,000 angstroms per minute for apparatus shown in FIG. 2) until the desired coating thickness is built up. Typically, on a 5 mil thick film the coating on each face is about .4 mils.

Figure 4:
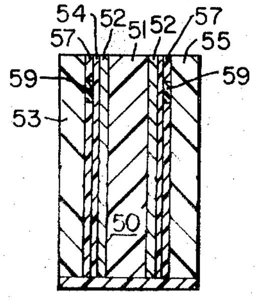
FIG. 4 is a view in section taken along line IV—IV of FIG. 3, enlarged.

The film 37 is then cut into smaller pieces (typically 1 × 1 ½ inch) and coated with a photoresist on both faces. Typically the photoresist is negative. When such a photoresist is imaged and developed the unexposed areas are dissolved, exposing the aluminum layer under the unexposed areas. A typical film 50 is shown in FIG. 4 and it includes a polyimide film 51, a coating 52 of metal on each face and a coating of photoresist 54 on each coating of aluminum.

Typical photoresist is KODAK Thin Film Resist. (KTFR). A typical coating process is as follows:

*a.* Photoresist is 60 percent KTFR in a thinner.

*b.* Film to be coated rotated about an axis perpendicular to its surface in coating solution at about 4,000 RPM.

*c.* Coating film air dried for 10 minutes.

*d.* Coated film baked at 120°C for 15 minutes.

The imaging of the photoresist is carried out on both faces of the sub-films 50 of the coated polyimide in such a way that the areas which define the holes or windows on each face are precisely coextensive with the areas which define the holes on the opposite face. For this purpose sheets of Mylar 53 and 55 or like plastic each of which has photographic emulsion 57 on one face are provided. Mylar composition is preferred because it maintains its dimensions. The sheets 53 and 55 are of substantially congruent dimensions and are substantially congruent with the film 50. The sheets 53 and 55 are exposed under a microscope and developed as a positive so that they have substantially equal patterns of opaque spots 59, corresponding to the desired patterns of holes in the polyimide, with corresponding spots 59 in each sheet 53 and 55 being in substantially the same relative positions. The remainder of the MYLAR sheets outside of the spots are transparent.

The sheets 53 and 55 are secured together at one end so that their surfaces coincide and the film 50 is interposed between them with the opaque spots 59 and the transparent surfaces 57 abutting the photoresist on the respective faces of the flim 50. Both sides of the film 50 are then exposed through the sheets 53 and 55, and coextensive transparent areas substantially congruent to the opaque spots 59 are defined in the photoresist 54. The film 50 is then developed producing metal spots corresponding to the and congruent to the spots 59 in the MYLAR film. Typically, the photoresist may be conveniently prepared such as not to respond appreciably to visible (yellow) light but to respond to ultraviolet light. For exposure a 600 watt quartz iodine lamp may be used. The exposure of KTFR is typically for 2 minutes.

A typical developing process for KTFR for the exposed film 50 is as follows:

*a.* Still development in Stoddard Solvent 2 minutes

*b.* Rinse in xylene - 10 seconds

*c.* Water rinse

*d.* Bake at 120°C for 30 minutes

The metal of the spots is next etched or dissolved by an acid etch. The acid etch does not appreciably dissolve the exposed photoresist and this protects from dissolution the metal under the developed photoresist. But for precise definition of the holes it is desirable that the etching take place in as short a time as practicable. It has been discovered, particularly for an aluminum coating, that the stability depends on the rate at which the metal was deposited, and for aluminum deposition and for deposit rates exceeding 2,500 angstroms per minute minutes the aluminum etched slowly and unevenly even where HCl was used as etchant. This rate differs from the higher rate of 5,000 angstroms per minute for sheets coated in apparatus as shown in FIG. 2 because the surface coated was at a smaller distance from the vapor source for the lower rate.

For aluminum a suitable etchant is as follows in parts by volume:

300 phosphoric acid, $H_3PO_4$

200 Acetic Acid, $CH_3COOH$ 10 nitric acid $HNO_3$

While increase in the acetic acid concentration increased the etch factor (rate of depth penetration rate to lateral rate) it resulted in uneven etching; the phosphoric acid improved the evenness of the etching. The nitric acid in small quantities prevents the deposit of unetchable black residue.

The film is rotated about an axis perpendicular to its surface in the etchant at about 180° every 30 seconds. The etchant is maintained at about 95° and is stirred typically by a magnetic stirrer. Typical etch rate is about .0003 inches per minute.

The film processed as just disclosed has exposed areas of polyimide corresponding to the desired holes. The holes are etched by immersing the film in hydrazine which etches the holes and dissolves the developed unexposed photoresist but not the metal under the unexposed photoresist. Typical conditions for etching are as follows:

*a.* Etchant — 65 percent by volume hydrazine in water

*b.* Temperature of etchant — 90°–95°C

*c.* Etchant is agitated.

*d.* Etching followed by hot water rinse for 1 minute.

*e.* Rinse in Methanol

*f.* Dry

While the holes are etched the photoresist on the film about the holes is also etched, exposing the metal. The metal is then etched away by an acid solvent.

Figure 5:
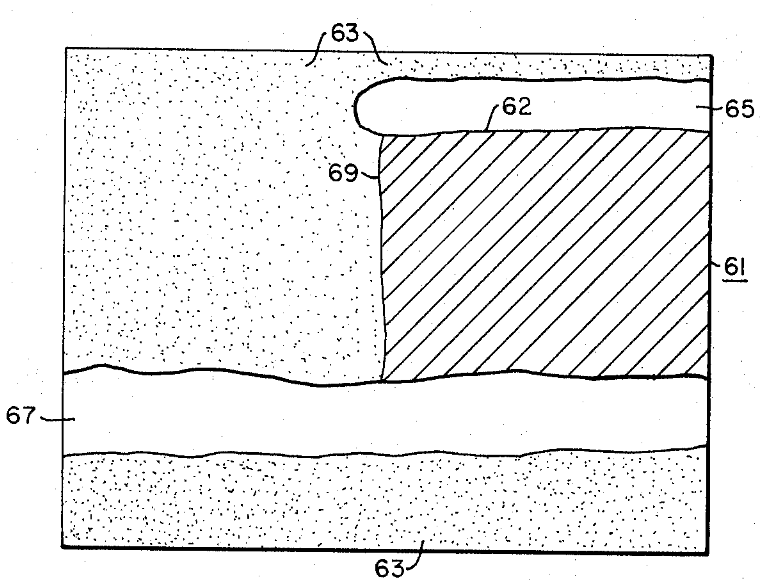
FIG. 5 is a reproduction of a photograph of a cross section of polyimide film etched on one face in the practice of this invention.

The above process has been found to be repeatable with the holes having clean edges well defined. A cut through a polyimide film 61 in which a penetration is etched in one face 62 is shown in FIG. 5. The section 61 was embedded in epoxy resin 63 which is sectioned in FIG. 5 by small dots. The coating metal was aluminum, the coatings 65 and 67 on both faces appearing unhatched. The etching of the polyimide was carried out on the part of the aluminum coating 65 overlying the area of the penetration, which coating was first etched away by an acid etchant. The boundary 69 of the penetration is reasonably vertical. The etch factor, ratio of depth penetration to lateral spread was 2.5 to 1.

Figure 6:
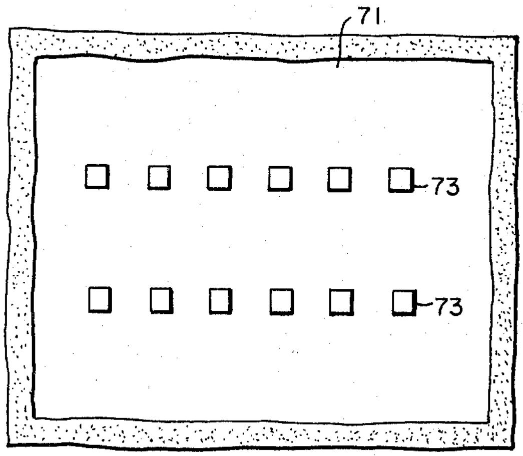
FIG. 6 is a reproduction of a photograph of a polyimide film of 5 mils thickness showing the windows which were etched in the practice of this invention.

FIG. 6 shows a polyimide sheet 71 with etched windows 73. This reproduction was derived from a sheet having a thickness of .005 inches.

While preferred embodiments of this invention have been disclosed herein many modifications thereof are feasible. This invention then is not to be restricted except insofar as is necessitated by the spirit of the prior art.

We claim:

1. The method of producing, by use of photoresist masking technique, a predetermined penetration selectably definable in a film of dielectric material, the said material being of the type wherein, to produce the desired penetration the etchant must be applied to the film for so long an interval that it breaks down the masking photoresist defining the area of the penetration, the said method comprising coating the film at least on one face with a first coating of a metal, depositing a second coating of a photoresist material on said first coating, exposing said second coating to radiation so as to produce a pattern on said second coating defining the area of said penetration, processing said exposed second coating so as to expose the first coating on said area while the processed photoresist masks the remainder of said film, etching away the said exposed first coating of said metal with a first solvent which does not appreciably dissolve the masking processed photoresist, to expose the dielectric material in said area, said masking photoresist masking the metal under it from dissolution, said metal and photoresist thereon defining said area and masking the remainder of said film, etching said penetration in said area with a second solvent which does not appreciably dissolve said metal, and removing said masking photoresist on said metal.

2. The method of claim 1 wherein the dielectric material is a polyimide and the metal is at least one of the class consisting of aluminum and copper.

3. The method of claim 2 wherein the first coating is deposited by vaporizing a coating material of the coating metal and projecting the vapor on the film.

4. The method of claim 1 wherein the film is composed of a polyimide material and is relatively thick.

5. The method of claim 2 wherein the film is relatively thick.

6. The method of claim 2 wherein the metal is deposited by projecting vapor onto the film and wherein the deposition is initially at a high rate to achieve firm adhesion of the deposited metal and the film and thereafter is at a low rate to achieve a coating which may be readily etched.

7. The method of claim 6 wherein the deposit of the metal is reduced gradually from a high rate to a low rate.

8. The method of claim 1 wherein the dielectric material is composed of a polyimide and prior to the deposit of the metal film is outgassed by being heated in a low-pressure medium.

9. The method of claim 8 wherein after the outgassing the film is thoroughly cleaned.

10. The method of claim 1 wherein the dielectric material is a polyimide, wherein the second solvent is hydrazine solution and the film is subjected to the hydrazine solution at temperatures between 90° and 95°C.

11. The method of claim 10 wherein the solution is an aqueous solution of about 65 percent hydrazine in water.

12. The method of claim 1 wherein the metal is aluminum and the first solvent is a mixture of phosphoric, acetic and nitric acids.

13. The method of claim 12 wherein the coated film is subjected to the first solvent at a temperature of about 60°C.

14. The method of claim 12 wherein the composition of first solvent is of approximately the following composition in parts by volume:

*a.* 375 of phosphoric acid
*b.* 75 of acetic acid
*c.* 15 of nitric acid

15. The method of claim 12 wherein the dielectric material is a polyimide and the second solvent is a solution of hydrazine.

16. The method of claim 1 wherein both surfaces of the film are coated with the first coating.

17. The method of claim 1 wherein the dielectric material is a polyimide which may be etched by hydrazine and the metal of the coating is substantially insoluble in hydrazine.

18. The method of claim 1 wherein both the penetration is etched and the masking photoresist is removed by the second solvent.

19. The method of producing a predetermined selectably definable penetration in a film of polyimide which comprises coating said film at least on one face with a first coating of a metal of the class consisting of aluminum and copper, depositing a second coating of a photoresist material on said first coating, exposing said second coating to radiation so as to produce a pattern on said second coating defining the area of said penetration, processing said exposed second coating so as to expose the first coating or said area while the processed photoresist masks the remainder of said film, etching away the said exposed first coating on said area with a solvent, which does not appreciably dissolve said masking processed photoresist, to expose the polyimide in said area, said masking processed photoresist masking the first coating under it from dissolution, etching said area with hydrazine to produce said penetration while said first coating masks the remainder of said film, and thereafter removing said masking photoresist from said first coating.

20. The method of claim 19 wherein the hydrazine also removes the masking photoresist.

21. The method of claim 20 wherein the etching takes place at about 90° to 95°C.

22. The method of claim 1 wherein the masking photoresist is removed by a solvent which does not appreciably dissolve the metal.

* * * * *